United States Patent [19]

Absil et al.

[11] Patent Number: 5,366,948
[45] Date of Patent: Nov. 22, 1994

[54] CATALYST AND CATALYTIC CONVERSION THEREWITH

[75] Inventors: Robert P. L. Absil, Mantua; Jocelyn A. Kowalski, Clarksboro, both of N.J.

[73] Assignee: Mobil Oil Corp., Fairfax, Va.

[21] Appl. No.: 90,869

[22] Filed: Jul. 13, 1993

Related U.S. Application Data

[63] Continuation-in-part of Ser. No. 667,854, Mar. 12, 1991, Pat. No. 5,231,064.

[51] Int. Cl.$^5$ ............... B01J 21/06; B01J 27/14; B01J 29/06
[52] U.S. Cl. ............................. 502/68; 502/81
[58] Field of Search ................. 502/68, 81; 208/114

[56] References Cited

U.S. PATENT DOCUMENTS

| | | | |
|---|---|---|---|
| 3,316,110 | 4/1967 | Herbst et al. | 106/65 |
| 3,354,096 | 11/1967 | Young | 252/435 |
| 3,867,279 | 2/1975 | Young | 208/114 |
| 4,356,338 | 10/1982 | Young | 585/407 |
| 4,454,241 | 6/1984 | Pine et al. | 502/68 |
| 4,567,152 | 1/1986 | Pine | 502/64 |
| 4,584,091 | 4/1986 | Pine | 208/114 |
| 4,839,319 | 6/1989 | Schuette et al. | 502/64 |
| 4,873,211 | 10/1989 | Walker et al. | 502/64 |
| 4,970,183 | 11/1990 | Nakamoto et al. | 502/68 |
| 5,082,815 | 1/1992 | Macedo | 502/68 |

FOREIGN PATENT DOCUMENTS

0358261 3/1990 European Pat. Off. .

*Primary Examiner*—Carl F. Dees
*Attorney, Agent, or Firm*—Alexander J. McKillop; Malcolm D. Keen; Dennis P. Santini

[57] ABSTRACT

A catalyst composition is provided which comprises a large-pore molecular sieve component and an additive catalyst component, said additive catalyst component having been formulated in a special way to provide an improved catalyst and conversion process. An embodiment of the present invention comprises an improved catalytic cracking process to produce high octane gasoline, and increased lower olefins, especially propylene and butylene.

22 Claims, No Drawings

CATALYST AND CATALYTIC CONVERSION THEREWITH

CROSS-REFERENCE TO RELATED APPLICATION

This is a continuation-in-part of application Ser. No. 07/667,854, filed Mar. 12, 1991, now U.S. Pat. No. 5,231,064.

FIELD OF THE INVENTION

The present invention relates to an improved catalyst composition, its manufacture, and a process for converting, e.g., cracking, a hydrocarbon feed over the improved catalyst composition to produce conversion product hydrocarbon compounds of lower molecular weight than feed hydrocarbons, e.g., product comprising a high octane gasoline fraction, and lower olefins, especially propylene and butylene. The catalyst composition of this invention includes an additive catalyst comprising the product of forming a slurry comprising clay, a source of phosphorus, a zeolite component, a non-zeolitic secondary binder component, e.g., colloidal silica optionally with peptized alumina, and spray drying the slurry at a pH of below about 3.

BACKGROUND OF THE INVENTION

Catalytic cracking operations are commercially employed in the petroleum refining industry to produce useful products, such as high quality gasoline and fuel oils, from hydrocarbon-containing feeds. The endothermic catalytic cracking of hydrocarbons is most commonly practiced in accordance with two known catalytic cracking operations, namely, fluid catalytic cracking (FCC) and moving bed catalytic cracking.

Generally, both fluid catalytic cracking and moving bed operations are commercially practiced in a cyclic mode. During these operations, the hydrocarbon feedstock is contacted with hot, active, solid particulate catalyst without added hydrogen, for example, at pressures of up to about 50 psig and temperatures up to about 650° C. As the hydrocarbon feed is cracked in the presence of cracking catalyst to form more valuable and desirable products, undesirable carbonaceous residue known as "coke" is deposited on the catalyst. The spent catalyst contains coke as well as metals that are present in the feedstock.

In FCC operations, the catalyst is a fine powder with particle sizes of about 20–200 microns in diameter and with an average size of approximately 60–100 microns. The fine powder is propelled upwardly through a riser reaction zone, fluidized and thoroughly mixed with the hydrocarbon feed. The hydrocarbon feed is cracked at high temperatures by the catalyst and separated into various hydrocarbon products. The coked catalyst particles are separated from the cracked hydrocarbon products, and after stripping, are transferred into a regenerator where the coke is burnt off to regenerate the catalyst. The regenerated catalyst then flows downwardly from the regenerator to the base of the riser.

The cycles of cracking and regeneration at high flow rates and temperatures have a tendency to physically break down the catalyst into smaller particles, called "fines" which have a diameter of up to 20 microns as compared to the average diameter of the catalyst particle of about 60 to about 100 microns. In determining the unit retention of catalysts, and accordingly their cost efficiency, attrition resistance is a key parameter. While the initial size of the particles can be controlled relatively easily by controlling the initial spray drying of the catalyst, if the attrition resistance is poor, the catalytic cracking unit may produce a large amount of the 0–20 micron fines which should not be released into the atmosphere. Commercial catalytic cracking units include cyclones and electrostatic precipitators to prevent fines from becoming airborne. Those skilled in the art appreciate that excessive generation of catalyst fines increases the cost of catalyst to the refiner.

Additionally, the catalyst particles cannot be too large in diameter, or the particles may not be sufficiently fluidized. Therefore, the catalysts are preferably maintained under 120 to 150 microns in diameter.

Another consideration is deposition of coke on the catalyst particles which is generally considered undesirable for two reasons: first, it inevitably results in a decline in catalytic activity to a point where the catalyst is considered to have become "spent"; and second, coke generally forms on the catalyst at the expense of more desired light liquid products. To regenerate the catalytic activity, the hydrocarbon residues of the coke must be burnt off the "spent" catalyst at elevated temperatures in a regenerator.

Current worldwide refinery trends indicate a continuing need to process heavier feed stock. As a result, many refineries will be processing feedstock containing resids or deeper cut gas oils which have high metals contents. The enhancement of octane produced in catalytic cracking operations is an important goal in the preparation of zeolite containing catalysts. The environmental regulations in the United States and abroad, and the phaseout of lead additives for gasolines in both the U.S. and abroad, provide a strong incentive for refineries to use catalysts which produce increased octane gasolines from heavier metals contaminated feedstock.

Therefore, it would be highly desirable to prepare a catalyst having a high attrition resistance. It would also be desirable to provide fluid catalysts having reduced manufacturing costs and improved catalytic activity for octane enhancement. Those skilled in the art will appreciate that improved attrition resistance as well as improved activity will translate into reduced catalyst makeup rates.

U.S. Pat. No. 5,110,776 teaches a method for preparing FCC catalyst comprising modifying the zeolite, e.g., ZSM-5, with phosphorus. U.S. Pat. No. 5,126,298 teaches manufacture of an FCC catalyst comprising zeolite, e.g., ZSM-5, clay, and phosphorus. Phosphorus treatment has been used on faujasite-based cracking catalysts for metals passivation (see U.S. Pat. Nos. 4,970,183 and 4,430,199); reducing coke make (see U.S. Pat. Nos. 4,567,152; 4,584,091; and 5,082,815); increasing activity (see U.S. Pat. Nos. 4,454,241 and 4,498,975); increasing gasoline selectivity (See U.S. Pat. No. 4,970,183); and increasing steam stability (see U.S. Pat. Nos. 4,765,884 and 4,873,211).

In U.S. Pat. No. 3,758,403, use of large-pore cracking catalyst with large amounts of ZSM-5 additive gives only modest increase in light olefin production. A 100% increase in ZSM-5 content (from 5 wt. % ZSM-5 to 10 wt. % ZSM-5) increased the propylene yield less than 20%, and decreased slightly the potential gasoline yield ($C_5+$ gasoline plus alkylate).

U.S. Pat. No. 4,309,280 teaches adding very small amounts of powdered, neat ZSM-5 catalyst, characterized by a particle size below 5 microns. Adding as little as 0.25 wt. % ZSM-5 powder to the FCC catalyst inventory increased LPG production 50%. Small amounts of neat powder behaved much like larger amounts of ZSM-5 disposed in larger particles.

A way to add a modest amount of ZSM-5 to an FCC unit is disclosed in U.S. Pat. No. 4,994,424, incorporated herein by reference. ZSM-5 additive is added to the equilibrium catalyst in a programmed manner so an immediate boost in octane number, typically ½–2 octane number, is achieved.

U.S. Pat. No. 4,927,523, incorporated herein by reference, teaches a way to add large amounts of ZSM-5 to a unit without exceeding wet gas compressor limits. Large amounts are added and cracking severity is reduced in the FCC unit for several days.

It is an object of the present invention to provide an improved catalyst and an improved cracking process using same.

It is a further object of the invention to provide an improved catalyst composition having suitable attrition resistance to impart an octane-enhancing property in the catalytic cracking process, and to enhance production of light olefins, e.g., propylene and butylene, in said process.

SUMMARY OF THE INVENTION

These and other objects are achieved by the present invention which provides an improved catalyst composition and a process for converting feedstock hydrocarbon compounds to product hydrocarbon compounds of lower molecular weight than the feedstock hydrocarbon compounds. The process comprises contacting the feedstock at conversion conditions with the improved catalyst composition comprising a large-pore molecular sieve and additive catalyst, the additive catalyst comprising clay, a zeolite, and one or more non-zeolitic secondary binders, the clay having been treated with a phosphorus-containing compound, for example, ammonium dihydrogen phosphate or phosphoric acid, and which is spray dried at a low pH, for example, lower than about 3, preferably lower than about 2. More particularly, the invention provides a hydrocarbon cracking process which uses the improved catalyst composition comprising a large-pore molecular sieve, such as, for example, USY, REY, or REUSY, and an additive catalyst comprising a crystalline zeolite having the structure of ZSM-5, clay, and an additional binder, such as, for example, silica, the clay having been treated with a phosphorus-containing compound, for example, ammonium dihydrogen phosphate or phosphoric acid, and which is spray dried at a low pH, for example, lower than about 3, preferably lower than about 2. The catalyst for use herein exhibits significantly improved attrition resistance and improved product quality.

The additive catalyst component of the catalyst composition of the invention is prepared by the steps of forming a slurry comprising clay, e.g., kaolin, a source of phosphorus, e.g., phosphoric acid, and zeolite, e.g., ZSM-5, adding an additional non-zeolitic inorganic oxide binder material, e.g., colloidal silica optionally with peptized alumina, and spray drying the final slurry at a low pH, for example, less than about 3.

In the process for converting, e.g., cracking, a hydrocarbon feedstock, the feedstock is contacted under catalytic conversion, e.g., cracking, conditions with the improved catalyst composition comprising a large-pore molecular sieve and the additive catalyst to yield the improved product. The additive catalyst component comprises from about 0.5 wt. % to about 50 wt. %, for example, from about 2 wt. % to about 50 wt. %, of the total improved catalyst, and it comprises, on a phosphorus-free basis, at least about 15 wt. % zeolite, for example, from about 20 wt. % to less than about 60 wt. % zeolite, preferably from about 25 wt. % to about 50 wt. % zeolite. Further, the additive catalyst component comprises at least about 0.9 wt. % phosphorus, preferably from at least about 0.9 wt. % to about 3.6 wt. % phosphorus.

Advantageously, the use of the present improved additive catalyst in the cracking process results in a high octane gasoline product, and an increased amount of lower olefins, with selectivity for petrochemical grade propylene and butylene. The propylene and butylene can be used, for example, in the manufacture of alkylate.

DETAILED DESCRIPTION

In catalytic cracking, high molecular weight hydrocarbons are converted to lower molecular weight hydrocarbons of suitable volatility to permit their use as liquid fuels. The combustion characteristics of gasoline are assessed empirically by assigning the fuel an octane rating. This is generally defined as a comparison with a primary reference which is the percentage of iso-octane (2,2,4-trimethylpentane) in an n-heptane/iso-octane mixture to which the gasoline under examination is equivalent in terms of combustion behavior when considering the octane ratings of n-heptane and iso-octane to be zero and 100 respectively. Both RON and MON can be tested on the same single-cylinder, four-stroke engine of standardized design. RON signifies the research octane number, MON signifies the motor octane number, and the terms are used to describe the knocking characteristics of gasoline, that is, its combustion behavior. For a measurement of RON, the engine speed used is 600 rpm which yields results comparable to an automobile engine operated at low speed. For a measurement of MON, the engine speed is 900 rpm which approximates higher speed cruising conditions. Generally, higher octane numbers are found by the research method compared to the motor method for the same gasoline sample. The average of the RON and MON, known as the road octane number, gives an indication of typical performance in an engine. The higher the octane, the better the combustion behavior in a spark-ignition engine. It has been found that road octane number correlates much more closely to the motor octane number than the research octane. Generally, aromatics and branched paraffinic and olefinic hydrocarbons have higher octane values than acyclic or linear paraffinic hydrocarbons.

In conjunction with catalytic cracking to produce gasoline product, alkylate and potential alkylate may result from the cracking process. This indirectly leads to product of increased octane because high octane, highly branched paraffinic gasoline blending stocks are produced principally by alkylation of $C_3$ and $C_4$ olefins with isobutane. Unlike cracking, alkylation makes larger branched hydrocarbons from smaller hydrocarbons and these larger branched hydrocarbons are inherently higher in octane.

The present process provides not only a high octane product, but significantly more light olefins, especially propylene and butylene. The lower olefins of this product are high quality, petrochemical grade, and may be used for manufacture of valuable ethers and/or alcohols, or as alkylating agents.

FEEDS

The feedstock, that is, the hydrocarbons to be cracked, may include in whole or in part, a gas oil (e.g., light, medium, or heavy gas oil) having an initial boiling point above about 204° C., a 50% point of at least about 260° C., and an end point of at least about 315° C. The feedstock may also include deep cut gas oil, vacuum gas oil, thermal oil, residual oil, cycle stock, whole top crude, tar sand oil, shale oil, synthetic fuel, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 400° C. must be carried out under vacuum in order to avoid thermal cracking. The boiling temperatures utilized herein are expressed in terms of convenience of the boiling point corrected to atmospheric pressure. Resids or deeper cut gas oils having an end point of up to about 700° C., even with high metals contents, can also be cracked using the invention.

Process

The present invention provides a process for converting feedstock hydrocarbon compounds to product hydrocarbon compounds of lower molecular weight than the feedstock hydrocarbon compounds. In particular, the present invention provides a process for catalytically cracking a hydrocarbon feed to a mixture of products comprising gasoline, alkylate, potential alkylate, and lower olefins, e.g., propylene, in the presence of a cracking catalyst under catalytic cracking conditions. Catalytic cracking units which are amenable to the process of the invention operate at temperatures from about 400° C. to about 650° C., usually from about 450° C. to about 600° C., and under reduced, atmospheric, or superatmospheric pressure, usually from about atmospheric to about 5 atmospheres. The catalytic process can be either fixed bed, moving bed, transfer line, or fluidized bed, and the hydrocarbon flow may be either concurrent or countercurrent to the catalyst flow. The process of the invention is particularly applicable to the Fluid Catalytic Cracking (FCC) or Thermofor Catalytic Cracking (TCC) processes. In both of these processes, the hydrocarbon feed and catalyst are passed through a reactor and the catalyst is regenerated. The two processes differ substantially in the size of the catalyst particles and in the engineering contact and transfer which is at least partially a function of catalyst size.

The TCC process is a moving bed and the catalyst is in the shape of pellets or beads having an average particle size of about one-sixty-fourth to one-fourth inch. Active, hot catalyst beads progress downwardly cocurrent with a hydrocarbon charge stock through a cracking reaction zone. The hydrocarbon products are separated from the coked catalyst and recovered, and the catalyst is recovered at the lower end of the zone and regenerated.

Typically preferred TCC conversion conditions include an average reactor temperature of from about 450° C. to about 540° C.; catalyst/oil volume ratio of from about 2 to about 7; reactor volume hourly space velocity of from about 1 to about 5 vol./hr./vol.; and recycle to fresh feed ratio of from 0 to about 0.5 (volume).

The process of the invention is particularly applicable to Fluid Catalytic Cracking. In fluidized catalytic cracking processes, the catalyst is a fine powder of about 10 to 200 microns. This powder is generally suspended in the feed and propelled upward in a reaction zone. A relatively heavy hydrocarbon feedstock, e.g., a gas oil, is admixed with a suitable cracking catalyst to provide a fluidized suspension and cracked in an elongated reactor, or riser, at elevated temperatures to provide a mixture of lighter hydrocarbon products. The gaseous reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbons from the spent catalyst prior to conveying the latter to a catalyst regenerator unit, an inert stripping gas, e.g., steam, is passed through the catalyst bed where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

Gas from the FCC main-column overhead receiver is compressed and directed with primary-absorber bottoms and stripper overhead gas through a cooler to the high pressure receiver. Gas from this receiver is routed to the primary absorber, where it is contacted by the unstabilized gasoline from the main-column overhead receiver. The net effect of this contacting is a separation between $C_3+$ and $C_2-$ fractions in the feed to the primary absorber. Primary absorber off-gas is directed to a secondary or sponge absorber, where a circulating stream of light cycle oil from the main column is used to absorb most of the remaining $C_5+$ material in the sponge absorber feed. Some $C_3$ and $C_4$ materials are also absorbed. The sponge-absorber rich oil is returned to the FCC main column. The sponge-absorber overhead, with most of the valuable $C_4+$ material removed but including $H_2S$, is sent to the fuel gas or other process streams.

Liquid from the high pressure separator is sent to a stripper where most of the $C_2-$ is removed overhead and sent back to the high pressure separator. The bottoms liquid from the stripper is sent to the debutanizer, where an olefinic $C_3-C_4$ product is further separated for gasoline production. The debutanizer bottoms, that is, the stabilized gasoline, is sent to treating, if necessary, and then to storage. The $C_3$ and $C_4$ product olefins can be directed to an alkylation unit to produce a high octane gasoline by the reaction of an isoparaffin (usually iso-butane) with one or more of the low molecular weight olefins (usually propylene and butylene).

The FCC conversion conditions include a riser top temperature of from about 500° C. to about 595° C., preferably from about 520° C. to about 565° C., and most preferably from about 530° C. to about 550° C.; catalyst/oil weight ratio of from about 3 to about 12, preferably from about 4 to about 11, and most preferably from about 5 to about 10; and catalyst residence time of from about 0.5 to about 15 seconds, preferably from about 1 to about 10 seconds.

Molecular Sieve Component

The large-pore molecular sieve component of the present improved catalyst may comprise any active component which has cracking activity and which has a pore opening of greater than about 7 Angstroms in effective diameter. The active component may be a conventional large-pore molecular sieve including zeolite X (U.S. Pat. No. 2,882,442); REX; zeolite Y (U.S. Pat. No. 3,130,007); Ultrastable Y (USY) (U.S. Pat. No. 3,449,070); Rare Earth exchanged Y (REY) (U.S. Pat. No. 4,415,438); Rare Earth exchanged USY (REUSY); Dealuminated Y (DeAl Y) (U.S. Pat. Nos. 3,442,792 and 4,331,694); Ultrahydrophobic Y (UHPY) (U.S. Pat. No. 4,401,556); and/or dealuminated silicon-enriched zeolites, e.g., LZ-210 (U.S. Pat. No. 4,678,765). Preferred are higher silica forms of zeolite Y. ZSM-20 (U.S. Pat. No. 3,972,983); zeolite Beta (U.S. Pat. No. 3,308,069); zeolite L (U.S. Pat. Nos. 3,216,789 and 4,701,315); and naturally occurring zeolites such as faujasite, mordenite and the like may also be used. These materials may be subjected to conventional treatments, such as impregnation or ion exchange with rare earths to increase stability. These patents are incorporated herein by reference. In current commercial practice most cracking catalysts contain these large-pore molecular sieves. The preferred molecular sieve of those listed above is a zeolite Y, more preferably an REY, USY or REUSY.

Other large-pore crystalline molecular sieves include pillared silicates and/or clays; aluminophosphates, e.g., ALPO$_4$-5, ALPO$_4$-8, VPI-5; silicoaluminophosphates, e.g., SAPO-5, SAPO-37, SAPO-40, MCM-9; and other metal aluminophosphates. Mesoporous crystalline material for use as the molecular sieve includes MCM-41. These are variously described in U.S. Pat. Nos. 4,310,440; 4,440,871; 4,554,143; 4,567,029; 4,666,875; 4,742,033; 4,880,611; 4,859,314; 4,791,083; 5,102,643; and 5,098,684, each incorporated herein by reference.

The preparation of some molecular sieve-containing catalysts may require reduction of the sodium content, as well as conversion to the acid (protonated) form. For example, with zeolites this can be accomplished by employing the procedure of converting the zeolite to an intermediate ammonium form as a result of ammonium ion exchange followed by calcination to provide the hydrogen form. The operational requirements of these procedures are well known in the art.

The source of the ammonium ion is not critical; thus the source can be ammonium hydroxide or an ammonium salt such as ammonium nitrate, ammonium sulfate, ammonium chloride and mixtures thereof. These reagents are usually in aqueous solutions. By way of illustration, aqueous solutions of 1N NH$_4$OH, 1N NH$_4$NO$_3$, 1N NH$_4$Cl, and 1N NH$_4$Cl/NH$_4$OH have been used to effect ammonium ion exchange. The pH of the ion exchange is not critical but is generally maintained at 7 to 12. Ammonium exchange may be conducted for a period of time ranging from about 0.5 to about 20 hours at a temperature ranging from ambient up to about 100° C. The ion exchange may be conducted in a single stage or in multiple stages. Calcination of the ammonium exchanged zeolite will produce its acid form. Calcination can be effected at temperatures up to about 550° C.

The large-pore molecular sieve catalyst component may include phosphorus or a phosphorus compound for any of the functions generally attributed thereto, such as, for example, attrition resistance, stability, metals passivation, and coke make reduction.

To prepare the large-pore molecular sieve component for use herein, a slurry may be formed by deagglomerating the molecular sieve, preferably in an aqueous solution. A slurry of the matrix material may be formed by mixing the desired matrix components such as clay and/or inorganic oxide in an aqueous solution. The molecular sieve slurry and the matrix slurry are then well mixed and spray dried to form catalyst particles of, for example, less than 200 microns in diameter.

Additive Catalyst Component

It is conventional to use an additive catalyst with different properties along with the conventional catalyst to form an optional mixed catalyst system. Commercially used additives are shape-selective zeolites. Zeolites having a Constraint Index of 1-12 can be used for this purpose. Details of the Constraint Index test are provided in J.Catalysis, 67, 218-222 (1981) and in U.S. Pat. No. 4,711,710 both of which are incorporated herein by reference.

Conventional shape-selective zeolites useful for this purpose are exemplified by large pore (e.g., greater than about 7 Angstroms pore size) zeolite Beta (U.S. Pat. No. 3,308,069); intermediate pore (e.g., pore size of from about 4 to about 7 Angstroms) zeolites ZSM-5 (U.S. Pat. No. 3,702,886 and Re. 29,948); ZSM-11 (U.S. Pat. No. 3,709,979); ZSM-12 Pat. No. 4,832,449); ZSM-22 (U.S. Pat. No. 4,556,477); ZSM-23 (U.S. Pat. No. 4,076,842); ZSM-35 (U.S. Pat. No. 4,016,245); ZSM48 (U.S. Pat. No. 4,397,827); ZSM-57 (U.S. Pat. No. 4,046,685) PSH-3 (U.S.Pat. No. 4,439,409); and MCM-22 (U.S. Pat. No. 4,954,325); and small pore (e.g., having pore openings of less than about 4 Angstroms diameter) zeolites ZSM-34 and erionite, either alone or in combination. In addition, the catalyst composition may include metals useful in promoting the oxidation of carbon monoxide to carbon dioxide under regenerator conditions as described in U.S. Pat. No. 4,350,614. The additive catalyst may also include phosphorus or a phosphorus compound for any of the functions generally attributed thereto.

In general, the additive catalyst component of the improved catalyst of this invention is manufactured by the following procedure. As will be evident from the specific examples hereinafter, the steps of this procedure are critical. This procedure comprises the steps of:

(a) preparing an aqueous slurry comprising clay, such as, for example, kaolin clay; a source of phosphorus, such as, for example, phosphoric acid, ammonium dihydrogen phosphate or mixture thereof, in an amount which will result in a final dried product of step (c) having from at least about 0.9 wt. % to about 3.6 wt. % phosphorus; and crystalline zeolite, such as one having the structure of ZSM-5, in an amount which will result in a final dried product of step (c) having from at least about 15 wt. % to less than about 60 wt. % zeolite component;

(b) adding to the slurry of step (a) a non-zeolitic secondary binder component, such as, for example, colloidal silica, optionally with an acid-soluble alumina;

(c) spray drying the slurry of step (b) at a low pH, such as a pH of less than about 3, preferably less than about 2; and (d) recovering a spray-dried product of step (c) having from at least about 0.9 wt. % to about 3.6 wt. % phosphorus and, on a phosphorus-free basis, from at least about 15 wt. % to less than about 60 wt. % zeolite component.

The preferred procedure for manufacturing the additive catalyst of the improved catalyst of this invention comprises the steps of:

(1) preparing an aqueous slurry comprising clay, such as, for example, kaolin clay;

(2) adding to the slurry of step (1) a source of phosphorus, such as, for example, phosphoric acid, ammonium dihydrogen phosphate or mixture thereof, in an amount which will result in a final dried product of step (5) having from at least about 0.9 wt. % to about 3.6 wt. % phosphorus;

(3) adding to the slurry of step (2) an aqueous slurry of crystalline zeolite, such as one having the structure of ZSM-5, in an amount which will result in a final dried product of step (5) having from at least about 15 wt. % to less than about 60 wt. % zeolite component;

(4) adding to the slurry of step (3) a non-zeolitic secondary binder component, such as, for example, colloidal silica, optionally with an acid-soluble alumina;

(5) spray drying the slurry of step (4) at a low pH, such as a pH of less than about 3, preferably less than about 2; and (6) recovering a spray-dried product of step (5) having from at least about 0.9 wt. % to about 3.6 wt. % phosphorus and, on a phosphorus-free basis, from at least about 15 wt. % to less than about 60 wt. % zeolite component.

The slurries of each step of the procedure may be mixed or milled to ensure homogeneity, and the recovered spray-dried product of step (d) or step (6) may be thermally treated, such as by calcination in air at a temperature of from about 200° C. to about 650° C.

Matrix

The matrix, i.e., binder, materials used are resistant to the temperatures and other conditions e.g., mechanical attrition, which occur in various hydrocarbon conversion processes such as cracking. It is generally necessary that the catalysts be resistant to mechanical attrition, that is, the formation of fines which are small particles, e.g., less than 20 µm. The cycles of cracking and regeneration at high flow rates and temperatures, such as in an FCC process, have a tendency to break down the catalyst into fines, as compared with an average diameter of catalyst particles of about 60–90 microns. In an FCC process, catalyst particles range from about 10 to about 200 microns, preferably from about 20 to 120 microns. Excessive generation of catalyst fines increases the refiner's catalyst costs.

The matrix may fulfill both physical and catalytic functions. Matrix materials include active or inactive inorganic materials such as clays, and/or metal oxides such as alumina or silica, titania, zirconia, or magnesia. The metal oxides may be in the form of a gelatinous precipitate or gel.

Use of an active matrix material in conjunction with the molecular sieve component that is combined therewith, may enhance the conversion and/or selectivity of the overall catalyst composition in certain hydrocarbon conversion processes. Inactive materials may serve as diluents to control the amount of conversion in a given process so that products can be obtained economically and in an orderly fashion without employing other means for controlling the rate of reaction. These materials may be incorporated as naturally occurring clays to improve the attrition resistance of the catalyst under commercial operating conditions.

Naturally occurring clays which can be composited with the catalyst include the montmorillonite and kaolin families which include the subbentonites, and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, catalysts can be composited with a porous matrix material such as silica-alumina, silica-magnesia, silica-zirconia, silica-thoria, silica-beryllia, silica-titania, as well as ternary materials such as silica-alumina-thoria, silica-alumina-zirconia, silica-alumina-magnesia, silica-magnesia-zirconia. The matrix can be in the form of a cogel. A mixture of these components can also be used.

In general, the relative proportions of finely divided, crystalline molecular sieve component and inorganic oxide gel matrix vary widely, with the molecular sieve content ranging from about 1 to about 90 percent by weight, and more usually from about 2 to about 80 weight percent of the composite.

The large-pore molecular sieve component may comprise from about 5 to about 60 weight percent of the catalyst composition. The additive catalyst component may comprise from about 0.5 to about 50, for example, from about 2 to about 50, weight percent of the catalyst composition. For the additive catalyst, the crystals having the structure of ZSM-5 may comprise from at least about 25 to less than about 60 weight percent of the additive catalyst component composition.

Although neither the cracking catalyst nor the additive catalyst need be steamed prior to use in the present process, and, in fact, are preferably not steamed prior to use herein, they may be steamed at a temperature of from about 300° C. to about 800° C. for a time of from about 1 to about 200 hours in about 5 to about 100% steam.

In order to more fully illustrate the nature of the invention and the manner of practicing same, the following examples are presented.

To determine the Attrition Index (AI) of the fluid catalysts prepared in the examples, 7.0 cc of sample catalyst was contacted in a 1.0 inch U-tube with an air jet formed by passing humidified (60%) air through a 0.07 inch nozzle at 21 liter/minute for 1 hour. The Attrition Index is defined as the percent of 0–20 micron fines generated during the test relative to the amount of >20 micron material initially present.

$$AI = 100 \times \frac{\text{wt \% of fines } AA - \text{wt \% fines } BA}{100 - \text{wt \% of fines } BA},$$

where AA means after attrition; BA means before attrition and fines means wt % of 0–20 micron material. The lower the Attrition Index, the more attrition resistant is the catalyst. Commercially acceptable attrition resistance is indicated by an Attrition Index of less than about 10.

EXAMPLE 1

A phosphorus-modified fluid catalyst containing the as-synthesized form of ZSM-5 was prepared by adding phosphoric acid to a zeolite slurry after it had been ball milled for 16 hours. The amount of phosphoric acid added was sufficient to impart 0.4 wt. % phosphorus to the finished catalyst. The zeolite was milled for 4 additional hours while in contact with the phosphoric acid. A second slurry was prepared by mixing a source of silica (colloidal silica, Nalco 1034A) with a source of alumina which is acid soluble (Condea Pural, pseudoboehmite alumina, peptized with formic acid). This slurry was mixed for 3 minutes at which time clay was added. The resulting slurry was mixed for 3 minutes and then the phosphorus-contacted zeolite slurry was added. This final slurry was mixed for 3 minutes and spray dried at an outlet temperature of 350–360° F. and a pH of 2.8. The spray-dried material was calcined in air at approximately 1000° F. until dried to less than 5 wt. % loss-on-ignition.

The attrition resistance of the resulting catalyst was measured:

| ZSM-5 Content, wt. % | Phosphorus Content, wt. % | Attrition Index |
| --- | --- | --- |
| 40 | 0.4 | 60 |

This example shows that a phosphorus-modified catalyst made by the method of contacting the zeolite with the source of phosphorus with additional ball milling results in commercially unacceptable attrition resistance.

EXAMPLE 2

A phosphorus-modified fluid catalyst containing the as-synthesized form of ZSM-5 was prepared by first mixing ZSM-5 sufficient to result in 40 wt. % ZSM-5 in the catalyst on a phosphorus-free basis with colloidal silica (Nalco 1034A) to form a slurry. To this slurry was added the clay and then sufficient phosphoric acid was added to produce a phosphorus level of 0.4 wt. % on the finished catalyst. The ZSM-5 was added in an aqueous slurry which had been milled to deagglomerate the ZSM-5 . The remaining portion of the non-zeolitic binder was then added to the slurry by adding an acid-soluble source of alumina (Condea Pural, pseudoboehmite alumina, peptized with formic acid). The resulting slurry was spray dried at a temperature of 350°–360° F. The spray-dried material was calcined in air at approximately 1000° F. until dried to less than 5 wt. % loss-on-ignition.

The attrition resistance of the resulting catalyst was measured:

| ZSM-5 Content, wt. % | Phosphorus Content, wt. % | Attrition Index |
| --- | --- | --- |
| 40 | 0.4 | 15 |

EXAMPLE 3

A phosphorus-modified fluid catalyst containing the as-synthesized form of ZSM-5 was prepared by first mixing kaolin clay with sufficient water to form a slurry which mixes freely. Then sufficient ZSM-5 was added to the slurry to result in 40 wt. % ZSM-5 in the catalyst on a phosphorus-free basis. To this slurry sufficient phosphoric acid was added to result in a phosphorus level of 1.7 wt. % on the finished catalyst. This was mixed for 2–3 minutes. The ZSM-5 was added in an aqueous slurry which had been milled to deagglomerate the ZSM-5 . A non-zeolitic binder was then added to the slurry by adding colloidal silica (Nalco 1034A), and then an acid-soluble source of alumina (Condea Pural, pseudoboehmite alumina, peptized with formic acid). The resulting slurry was spray dried at a temperature of 350°–360° F. The spray-dried material was calcined in air at approximately 1000° F. until dried to less than 5 wt. % loss-on-ignition.

The attrition resistance of the resulting catalyst was measured:

| ZSM-5 Content, wt. % | Phosphorus Content, wt. % | Attrition Index |
| --- | --- | --- |
| 40 | 1.7 | 15 |

EXAMPLE 4

A phosphorus-modified fluid catalyst containing the as-synthesized form of ZSM-5 was prepared by first mixing kaolin clay with sufficient water to form a slurry which mixes freely. To this slurry sufficient phosphoric acid was added to result in a phosphorus level of about 2.3–2.5 wt. % on the finished catalyst. This was mixed for 5 minutes. Then sufficient ZSM-5 was added to the slurry to result in 40 wt. % ZSM-5 in the catalyst on a phosphorus-free basis. This slurry was mixed for 5 minutes. The ZSM-5 was added in an aqueous slurry which had been milled to deagglomerate the ZSM-5 . A non-zeolitic secondary binder was then added to the slurry by adding colloidal silica (Nalco 1034A), and then an acidsoluble source of alumina (Condea Pural, pseudoboehmite alumina, peptized with formic acid). The resulting slurry was spray dried at a temperature of 350°–360° F. and a pH of 1.95. The spray-dried material was calcined in air at approximately 1000° F. until dried to less than 5 wt. % loss-on-ignition.

This preparation was repeated twice. The attrition resistance of the resulting three catalysts was measured:

| | ZSM-5 Content, wt. % | Phosphorus Content, wt. % | Attrition Index |
| --- | --- | --- | --- |
| Initial | 40 | 2.3 | 4 |
| Repeat #1 | 40 | 2.3 | 4 |
| Repeat #2 | 40 | 2.5 | 5 |

This example shows that a phosphorus-modified catalyst can be made with a ZSM-5 level of at least about 15 wt. % and with commercially acceptable attrition resistance at a phosphorus level of greater than about 0.9 wt. %, e.g., about 2.3–2.5 wt. %, using the present additive catalyst preparation method.

EXAMPLE 5

A catalyst containing the as-synthesized form of ZSM-5 was prepared by first mixing kaolin clay with sufficient water to form a slurry which mixes freely. Then sufficient ZSM-5 was added to the slurry to result in 40 wt. % ZSM-5 in the catalyst on a phosphorus-free basis. To this slurry sufficient phosphoric acid was added to result in a phosphorus level of about 3 wt. % on the finished catalyst. This was mixed for 2–3 minutes. The ZSM-5 was added in an aqueous slurry which had been milled to deagglomerate the ZSM-5 . A non-zeolitic secondary binder was then added to the slurry by adding colloidal silica (Nalco 1034A), and then an acid-soluble source of alumina (Condea Pural, pseudoboehmite alumina, peptized with formic acid). The resulting slurry was spray dried at a temperature of 350°–360° F. at a pH of less than about 3. The spray-dried material was calcined in air at approximately 1000° F. until dried to less than 5 wt. % loss-on ignition.

The attrition resistance of the resulting catalyst was measured:

| ZSM-5 Content, wt. % | Phosphorus Content, wt. % | Attrition Index |
|---|---|---|
| 40 | 3.0 | 4 |

This example shows that further increasing the level of phosphorus to 3.0 wt. % does not affect the attrition resistance (variability is ±2).

EXAMPLE 6

A phosphorus-modified fluid catalyst containing the as-synthesized form of ZSM-5 was prepared by first mixing kaolin clay with sufficient water to form a slurry which mixes freely. Then sufficient ZSM-5 was added to the slurry to result in 50 wt. % ZSM-5 in the catalyst on a phosphorus-free basis. To this slurry sufficient phosphoric acid was added to result in a phosphorus level of about 2.5 wt. % on the finished catalyst. This was mixed for 2–3 minutes. The ZSM-5 was added in an aqueous slurry which had been milled to deagglomerate the ZSM-5. A non-zeolitic secondary binder was then added to the slurry by adding colloidal silica (Nalco 1034A), and then an acid-soluble source of alumina (Condea Pural, pseudoboehmite alumina, peptized with formic acid). The resulting slurry was spray dried at a temperature of 350°–360° F. and a pH of less than about 3. The spray-dried material was calcined in air at approximately 1000° F. until dried to less than 5 wt. % loss-on-ignition.

The attrition resistance of the resulting catalyst was measured:

| ZSM-5 Content, wt. % | Phosphorus Content, wt. % | Attrition Index |
|---|---|---|
| 50 | 2.5 | 6 |

This example shows that the present method of additive catalyst manufacture with about 2.5 wt. % phosphorus is applicable to a zeolite level of 50 wt. %.

EXAMPLE 7

A phosphorus-modified fluid catalyst containing the as-synthesized form of ZSM-5 was prepared by first mixing kaolin clay with sufficient water to form a slurry which mixes freely. Then sufficient ZSM-5 was added to the slurry to result in 60 wt. % ZSM-5 in the catalyst on a phosphorus-free basis. To this slurry sufficient phosphoric acid was added to result in a phosphorus level of about 1.7 wt. % on the finished catalyst. This slurry was mixed for 2–3 minutes. The ZSM-5 was added in an aqueous slurry which had been milled to deagglomerate the ZSM-5. A non-zeolitic secondary binder was then added to the slurry by adding colloidal silica (Nalco 1034A), and then an acid-soluble source of alumina (Condea Pural, pseudoboehmite alumina, peptized with formic acid). The resulting slurry was spray dried at a temperature of 350°–360° F. and a pH of less than about 3. The spray-dried material was calcined in air at approximately 1000° F. until dried to less than 5 wt. % loss-on-ignition.

The attrition resistance of the resulting catalyst was measured:

| ZSM-5 Content, wt. % | Phosphorus Content, wt. % | Attrition Index |
|---|---|---|
| 60 | 1.7 | 15 |

This example shows that at a zeolite level of 60 wt. %, the attrition resistance is no longer commercially acceptable.

EXAMPLE 8

The Initial catalyst preparation and Repeat #1 of Example were blended together. This catalyst was then steam deactivated for 10 hours at 1450° F. with 100% steam at 6 psig. This catalyst was blended to 0.625 wt. % with a sample of an REY-type base cracking catalyst which was removed from a commercial FCC unit following regeneration.

EXAMPLE 9

The catalyst of Example 8 was evaluated in a fixed-fluidized bed unit at 960° F. for its ability to crack Joliet Sour Heavy Gas Oil. The catalyst was evaluated over 2 catalyst/oil ratios. The yield and octane performance of the catalyst blend (Example 8) are compared to the performance of the base cracking catalyst alone at an interpolated conversion of 67 wt. % in Table 1. The additive catalyst of Example 4 resulted in a gasoline yield loss of only 4.7 vol.% which is offset by an 8.9 vol.% potential alkylate gain. Also, yields of propylene and butylene were significantly increased.

TABLE 1

|  | Base Catalyst | Base Catalyst + Additive |
|---|---|---|
| Gasoline, vol. % | 51.9 | 47.2 |
| RON, C5+ gasoline | 91 | 92 |
| Coke, wt. % | 5.9 | 6.3 |
| Propylene, vol. % | 6.8 | 10.6 |
| Butylene, vol. % | 5.3 | 6.9 |
| Iso-butane, vol. % | 7.3 | 7.9 |
| Potential alkylate, vol. % | 20.1 | 29.0 |

What is claimed is:

1. A method for manufacturing a catalyst component comprising the steps of:
   (a) preparing an aqueous slurry comprising clay, a source of phosphorus in an amount which will result in a final dried product of step (c) having from at least about 0.9 wt. % to about 3.6 wt. % phosphorus, and crystalline zeolite in an amount which will result in a final dried product of step (c) having from at least about 15 wt. % to less than about 60 wt. % zeolite component;
   (b) adding to the slurry of step (a) a non-zeolitic secondary binder component;
   (c) spray drying the slurry of step (b) at a pH of less than about 3; and
   (d) recovering a spray-dried product of step (c) having from at least about 0.9 wt. % to about 3.6 wt. % phosphorus and, on a phosphorus-free basis, from at least about 15 wt. % to less than about 60 wt. % zeolite component.

2. The method of claim 1 wherein said source of phosphorus in step (a) is phosphoric acid, ammonium dihydrogen phosphate or mixture thereof.

3. The method of claim 1 wherein said zeolite has the structure of ZSM-5.

4. The method of claim 1 wherein said secondary binder component of step (b) comprises silica, alumina or mixture thereof.

5. The method of claim 1 wherein said secondary binder component of step (b) comprises colloidal silica.

6. The catalyst component product of the method of claim 1.

7. A catalyst composition comprising a large-pore molecular sieve component having pore openings of greater than about 7 Angstroms and from about 0.5 wt. % to about 50 wt. % catalyst component of claim 6.

8. A catalyst composition comprising a large-pore molecular sieve component having pore openings of greater than about 7 Angstroms and from about 2 wt. % to about 50 wt. % catalyst component of claim 6.

9. The catalyst composition of claim 7 wherein said large-pore molecular sieve component is selected from the group consisting of zeolites X, REX, Y, USY, REY, REUSY, DeAlY, UHPY, LZ-210, Beta, ZSM-20, L, silicoaluminophosphates SAPO-5, SAPO-37, SAPO-40, MCM-9, pillared silicates, pillared clays, mesoporous crystalline MCM-41 and mixtures thereof.

10. The catalyst composition of claim 9 wherein said large-pore molecular sieve component is selected from the group consisting of zeolites Y, USY, REY, and REUSY.

11. A catalyst composition comprising a large-pore molecular sieve component selected from the group consisting of zeolites Y, USY, REY, and REUSY, and from about 2 wt. % to about 50 wt. % catalyst component manufactured by the steps of:
   (a) preparing an aqueous slurry comprising clay, a source of phosphorus in an amount which will result in a final dried product of step (c) having from at least about 0.9 wt. % to about 3.6 wt. % phosphorus, and crystalline zeolite having the structure of ZSM-5 in an amount which will result in a final dried product of step (c) having from at least about 15 wt. % to less than about 60 wt. % zeolite component;
   (b) adding to the slurry of step (a) a non-zeolitic secondary binder component;
   (c) spray drying the slurry of step (b) at a pH of less than about 3; and
   (d) recovering a spray-dried product of step (c) having from at least about 0.9 wt. % to about 3.6 wt. % phosphorus and, on a phosphorus-free basis, from at least about 15 wt. % to less than about 60 wt. % zeolite component.

12. A method for manufacturing a catalyst component comprising the steps of:
   (1) preparing an aqueous slurry comprising clay;
   (2) adding to the slurry of step (1) a source of phosphorus in an amount which will result in a final dried product of step (5) having from at least about 0.9 wt. % to about 3.6 wt. % phosphorus;
   (3) adding to the slurry of step (2) an aqueous slurry of crystalline zeolite in an amount which will result in a final dried product of step (5) having from at least about 15 wt. % to less than about 60 wt. % zeolite component;
   (4) adding to the slurry of step (3) a non-zeolitic secondary binder component;
   (5) spray drying the slurry of step (4) at a pH of less than about 3; and
   (6) recovering a spray-dried product of step (5) having from at least about 0.9 wt. % to about 3.6 wt. % phosphorus and, on a phosphorus-free basis, from at least about 15 wt. % to less than about 60 wt. % zeolite component.

13. The method of claim 12 wherein said source of phosphorus in step (2) is phosphoric acid, ammonium dihydrogen phosphate or mixture thereof.

14. The method of claim 12 wherein said zeolite has the structure of ZSM-5.

15. The method of claim 12 wherein said secondary binder component of step (4) comprises silica, alumina or mixture thereof.

16. The method of claim 12 wherein said secondary binder component of step (4) comprises colloidal silica.

17. The catalyst component product of the method of claim 12.

18. A catalyst composition comprising a large-pore molecular sieve component having pore openings of greater than about 7 Angstroms and from about 0.5 wt. % to about 50 wt. % catalyst component of claim 17.

19. A catalyst composition comprising a large-pore molecular sieve component having pore openings of greater than about 7 Angstroms and from about 2 wt. % to about 50 wt. % catalyst component of claim 17.

20. The catalyst composition of claim 18 wherein said large-pore molecular sieve component is selected from the group consisting of zeolites X, REX, Y, USY, REY, REUSY, DeAlY, UHPY, LZ-210, Beta, ZSM-20, L, silicoaluminophosphates SAPO-5, SAPO-37, SAPO-40, MCM-9, pillared silicates, pillared clays, mesoporous crystalline MCM-41 and mixtures thereof.

21. The catalyst composition of claim 20 wherein said large-pore molecular sieve component is selected from the group consisting of zeolites Y, USY, REY, and REUSY.

22. A catalyst composition comprising a large-pore molecular sieve component selected from the group consisting of zeolites Y, USY, REY, and REUSY, and from about 2 wt. % to about 50 wt. % catalyst component manufactured by the steps of:
   (1) preparing an aqueous slurry comprising clay;
   (2) adding to the slurry of step (1) a source of phosphorus in an amount which will result in a final dried product of step (5) having from at least about 0.9 wt. % to about 3.6 wt. % phosphorus;
   (3) adding to the slurry of step (2) an aqueous slurry of crystalline zeolite having the structure of ZSM-5 in an amount which will result in a final dried product of step (5) having from at least about 15 wt. % to less than about 60 wt. % zeolite component;
   (4) adding to the slurry of step (3) a non-zeolitic secondary binder component;
   (5) spray drying the slurry of step (4) at a pH of less than about 3; and
   (6) recovering a spray-dried product of step (5) having from at least about 0.9 wt. % to about 3.6 wt. % phosphorus and, on a phosphorus-free basis, from at least about 15 wt. % to less than about 60 wt. % zeolite component.

* * * * *